US012304194B2

(12) United States Patent
Veis et al.

(10) Patent No.: US 12,304,194 B2
(45) Date of Patent: May 20, 2025

(54) PRINT ZONE DRIVER FOR A PRINTER CONVEYOR BELT

(71) Applicant: HP SCITEX LTD., Netanya (IL)

(72) Inventors: Alex Veis, Netanya (IL); Semion Birger, Netanya (IL)

(73) Assignee: HP SCITEX LTD., Netanya (IL)

( * ) Notice: Subject to any disclaimer, the term of this patent is extended or adjusted under 35 U.S.C. 154(b) by 97 days.

(21) Appl. No.: 17/823,451

(22) Filed: Aug. 30, 2022

(65) Prior Publication Data

US 2023/0084327 A1 Mar. 16, 2023

(30) Foreign Application Priority Data

Sep. 15, 2021 (EP) .................................... 21196908

(51) Int. Cl.
*B41J 11/00* (2006.01)
*B65H 5/02* (2006.01)

(52) U.S. Cl.
CPC .......... *B41J 11/007* (2013.01); *B41J 11/0085* (2013.01); *B65H 5/021* (2013.01); *B65H 2553/51* (2013.01); *B65H 2801/06* (2013.01)

(58) Field of Classification Search
CPC ..... B41J 11/007; B41J 11/0085; B65H 5/021; B65H 2553/51; B65H 2801/06
See application file for complete search history.

(56) References Cited

U.S. PATENT DOCUMENTS 3,889,801 A 6/1975 Boyer
4,753,119 A 6/1988 Kuspert
5,507,481 A 4/1996 Meyer et al.
5,757,407 A 5/1998 Rezanka
5,940,105 A 8/1999 Hayami
6,179,419 B1 1/2001 Rasmussen et al.
6,290,351 B1 9/2001 Merz
7,914,099 B2 3/2011 Loh et al.
8,839,941 B2 9/2014 Fehr et al.
12,179,475 B2 12/2024 Veis et al.
2002/0018097 A1 2/2002 Kitahara et al.
(Continued)

FOREIGN PATENT DOCUMENTS

DE 102004045486 A1 * 5/2005 .......... B65H 11/005
EP 0193567 B1 12/1987
(Continued)

OTHER PUBLICATIONS

Okawa, Elji, Printing Press, Mar. 2, 1999, Japan, All pages (Year: 1999).*
(Continued)

*Primary Examiner* — Douglas X Rodriguez
*Assistant Examiner* — Tracey M McMillion
(74) *Attorney, Agent, or Firm* — Jordan IP Law, LLC

(57) ABSTRACT

A system to carry print media through a print zone in a printer. In one example, the system includes an endless conveyor belt in a loop, a driver operatively connected to the conveyor belt under the print zone to circulate the conveyor belt through the print zone, an encoder operatively connected to the driver under the print zone to measure movement of the conveyor belt in the print zone indirectly through the driver, and a controller programmed to control the driver based on measurements from the encoder.

15 Claims, 6 Drawing Sheets

(56) References Cited

U.S. PATENT DOCUMENTS

| | | | | |
|---|---|---|---|---|
| 2003/0038420 | A1 | 2/2003 | Cleary et al. | |
| 2005/0046667 | A1 * | 3/2005 | Ando | B41J 11/007 347/40 |
| 2006/0186593 | A1 | 8/2006 | Shibuya | |
| 2007/0045939 | A1 | 3/2007 | Toya et al. | |
| 2009/0301237 | A1 | 12/2009 | Everman | |
| 2010/0244364 | A1 | 9/2010 | Komiyama et al. | |
| 2011/0128557 | A1 | 6/2011 | Kinoshita et al. | |
| 2011/0293346 | A1 | 12/2011 | Sato | |
| 2014/0178115 | A1 | 6/2014 | Fujisawa et al. | |
| 2014/0240423 | A1 | 8/2014 | Cressman et al. | |
| 2017/0043598 | A1 * | 2/2017 | Sanaei | B41J 11/08 |
| 2018/0281472 | A1 | 10/2018 | Terradellas Callau et al. | |
| 2019/0291475 | A1 * | 9/2019 | Ota | B41J 11/007 |
| 2020/0230981 | A1 | 7/2020 | Gunji | |
| 2020/0254789 | A1 | 8/2020 | Martin et al. | |
| 2022/0402282 | A1 | 12/2022 | Veis et al. | |

FOREIGN PATENT DOCUMENTS

| | | | | |
|---|---|---|---|---|
| EP | 1655141 | A2 | 5/2006 | |
| EP | 3121021 | A2 | 1/2017 | |
| EP | 3150391 | A2 | 4/2017 | |
| EP | 3308969 | A1 | 4/2018 | |
| EP | 3392048 | A1 | 10/2018 | |
| EP | 3594005 | A1 | 1/2020 | |
| JP | 57-156947 | A | 9/1982 | |
| JP | 07-187441 | A | 7/1995 | |
| JP | 07-281495 | A | 10/1995 | |
| JP | 4057115 | B2 * | 3/2008 | B41L 13/06 |
| JP | 2019-001646 | A | 1/2019 | |
| WO | 2021/142326 | A1 | 7/2021 | |

OTHER PUBLICATIONS

Bell-Everman, “Linear Motion Engineering Guide”, retrieved at https://www.bell-everman.com/linear-motion-engineering-guide, retrieved on Oct. 3, 2018, pp. 13.

* cited by examiner

PRINT ZONE DRIVER FOR A PRINTER CONVEYOR BELT

BACKGROUND

In some large industrial inkjet printers, a vacuum conveyor belt is used to hold down corrugated cardboard or other media flat for printing as the belt carries the cardboard through the print zone.

DRAWINGS

The same part numbers designate the same or similar parts throughout the figures. The figures are not necessarily to scale.

DESCRIPTION

Figure 1:
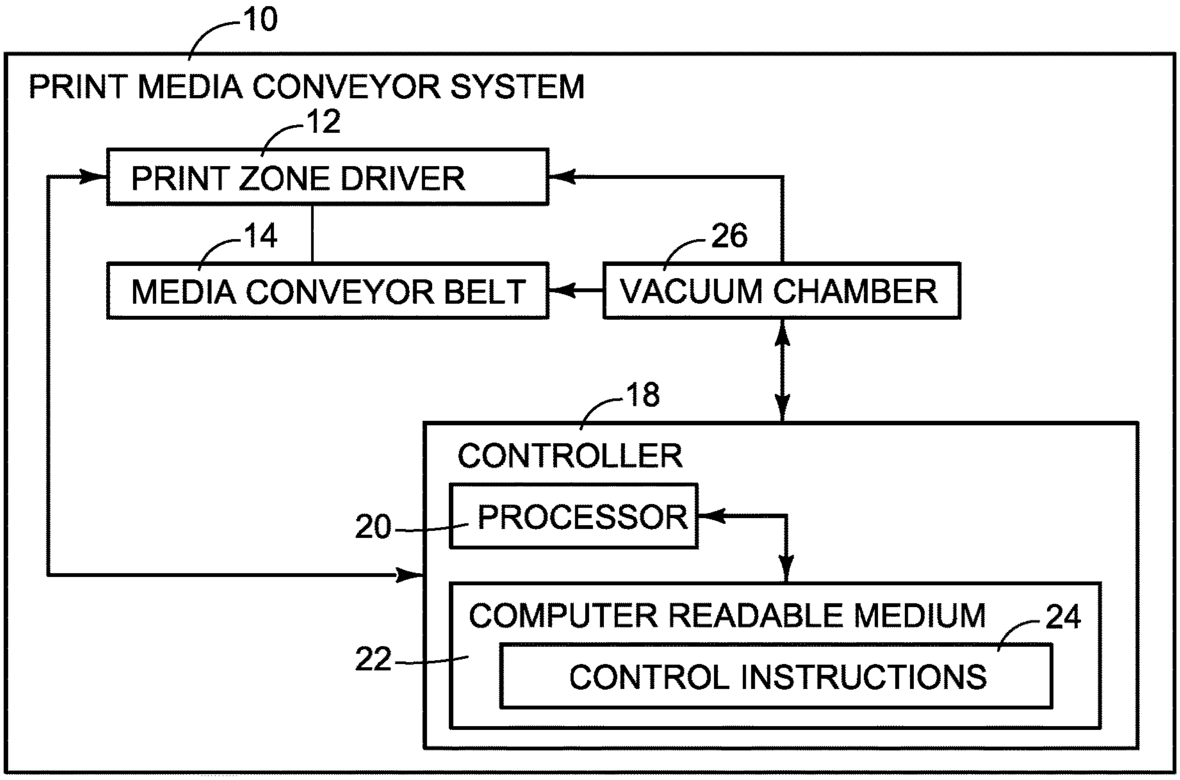
FIG. 1 is a block diagram illustrating one example of a print media conveyor system with a print zone driver.

In some large industrial inkjet printers, a vacuum conveyor belt is used to hold down corrugated cardboard and other print media flat for printing. The conveyor belt forms a loop driven with a pulley at one end of the loop around an idler pulley at the other end of the loop. The print media is carried along the upper run of the belt loop through a print zone in which ink is dispensed on to the media from a printing unit above the belt. The printing unit may include multiple print bars that extend across the full width of the belt to print each of multiple corresponding color planes on to the media in a single pass. A rotary encoder operatively connected to the drive pulley gives feedback to a controller to help regulate the belt speed and/or the timing of the printing unit dispensing ink.

The vacuum holding down the print media applies strong normal forces to the belt as it moves through the print zone, creating friction between the belt and the underlying supports. This friction, which is not uniform along the belt, can cause small jumps in belt speed that are not detected by the rotary encoder measuring rotation of a drive pulley located away from the print zone. The drive pulley may be located 2 m or even 3 m from the print zone for printers printing corrugated cardboard, limiting the ability of the control system to quickly respond to belt speed variations in the print zone. In addition, the significant time delays measuring and responding to belt speed variations in the print zone increases phase lag, allowing stable operation in only a low gain region that cannot correct high frequency errors.

A new print media conveyor belt drive system has been developed to help more accurately control movement of a vacuum conveyor belt through the print zone and thus more accurately correct for any unwanted variations in belt speed. The driver is positioned under the print zone to help reduce the time to respond to variations in belt speed. In an example, the driver includes a drive pulley and a drive belt positioned under the conveyor belt in the print zone. The drive belt engages the upper run of the conveyor belt to circulate the conveyor belt through the print zone at the urging the drive pulley. A vacuum may be applied to the conveyor belt through holes in the drive belt to pull down the conveyor belt against the drive belt for better traction. In an example, an encoder is positioned under the print zone to more accurately measure movement of the conveyor belt through the print zone compared to measuring movement of the conveyor belt at a location away from the print zone. The print zone encoder may be implemented, for example, as a rotary encoder on the drive pulley or as a linear encoder on the drive belt.

These and other examples described below and shown in the figures illustrate but do not limit the scope of the patent, which is defined in the Claims following this Description.

As used in this document: "and/or" means one or more of the connected things; and a "computer readable medium" means any non-transitory tangible medium that can embody, contain, store, or maintain instructions and other information for use by a processor and may include, for example, circuits, integrated circuits, ASICs (application specific integrated circuits), hard drives, random access memory (RAM), read-only memory (ROM), and flash memory.

Figure 2:
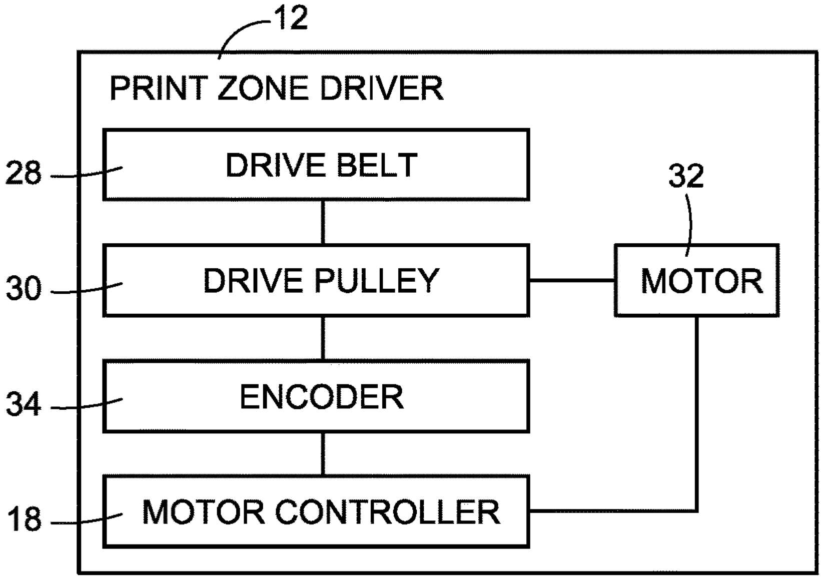
FIG. 2 is a block diagram illustrating an example implementation for a print zone driver in the print media conveyor system shown in FIG. 1.

FIG. 1 is a block diagram illustrating one example of a conveyor belt system 10 to convey print media through a print zone in a printer. FIG. 2 is a block diagram illustrating an example implementation for a driver 12 in the print media conveyor belt system 10 shown in FIG. 1. FIGS. 3-8 illustrate an example implementation for a print media conveyor belt system 10 and driver 12 shown in the block diagrams of FIGS. 1 and 2.

Referring to FIG. 1, system 10 includes an endless conveyor belt 14 in a loop to carry corrugated cardboard or other print media through a print zone for printing, and a driver 12 operatively connected to conveyor belt 14 under the print zone to circulate conveyor belt 14 through the print zone. System 10 also includes a controller 18 operatively connected to driver 12. Controller 18 represents the processing and memory resources and the programming, electronic circuitry and components needed to control the operative elements of system 10. Controller 18 may include distinct control elements for individual system components. In the example shown in FIG. 1, controller 18 includes a processor 20 and a computer readable medium 22 with control instructions 24 that represent programming to control driver 12 and thus the speed of belt 14. Where conveyor belt 14 is implemented as a vacuum belt, system 10 may include a vacuum chamber 26 operatively coupled to conveyor belt 14 to hold down print media flat on conveyor belt 14 for printing. Also, if driver 12 uses a drive belt to drive conveyor belt 14, for example as described below with reference to FIGS. 2-6, vacuum chamber 26 may be operatively connected to driver 12 to hold down conveyor belt 14 on the drive belt for better traction.

FIG. 2 illustrates an example implementation for a print zone driver 12 shown in FIG. 1. Referring to FIG. 2, driver 12 includes an endless drive belt 28 in a loop, a drive pulley 30 to circulate drive belt 28, and a motor 32 to turn drive pulley 30. Drive belt 28 engages conveyor belt 14 in FIG. 1 to circulate the conveyer belt through the print zone. Driver 12 in FIG. 2 also includes an encoder 34 and a motor controller 18 operatively connected to encoder 34 and motor 36. Encoder 34 measures the movement of conveyor belt 14 in the print zone indirectly through driver 12. Encoder 34 may be implemented, for example, as a rotary encoder on drive pulley 30 or a linear encoder on drive belt 28. Measurements from encoder 34 are used by controller 18 executing instructions 24 (FIG. 1) to control the speed of conveyor belt 14 in the print zone through motor 32 turning drive pulley 30 circulating drive belt 28 moving conveyor belt 14. While encoder 34 is shown in FIG. 2 as part of driver 12, an encoder 34 could be considered a separate part operatively connected to a driver 12.

Figure 3:
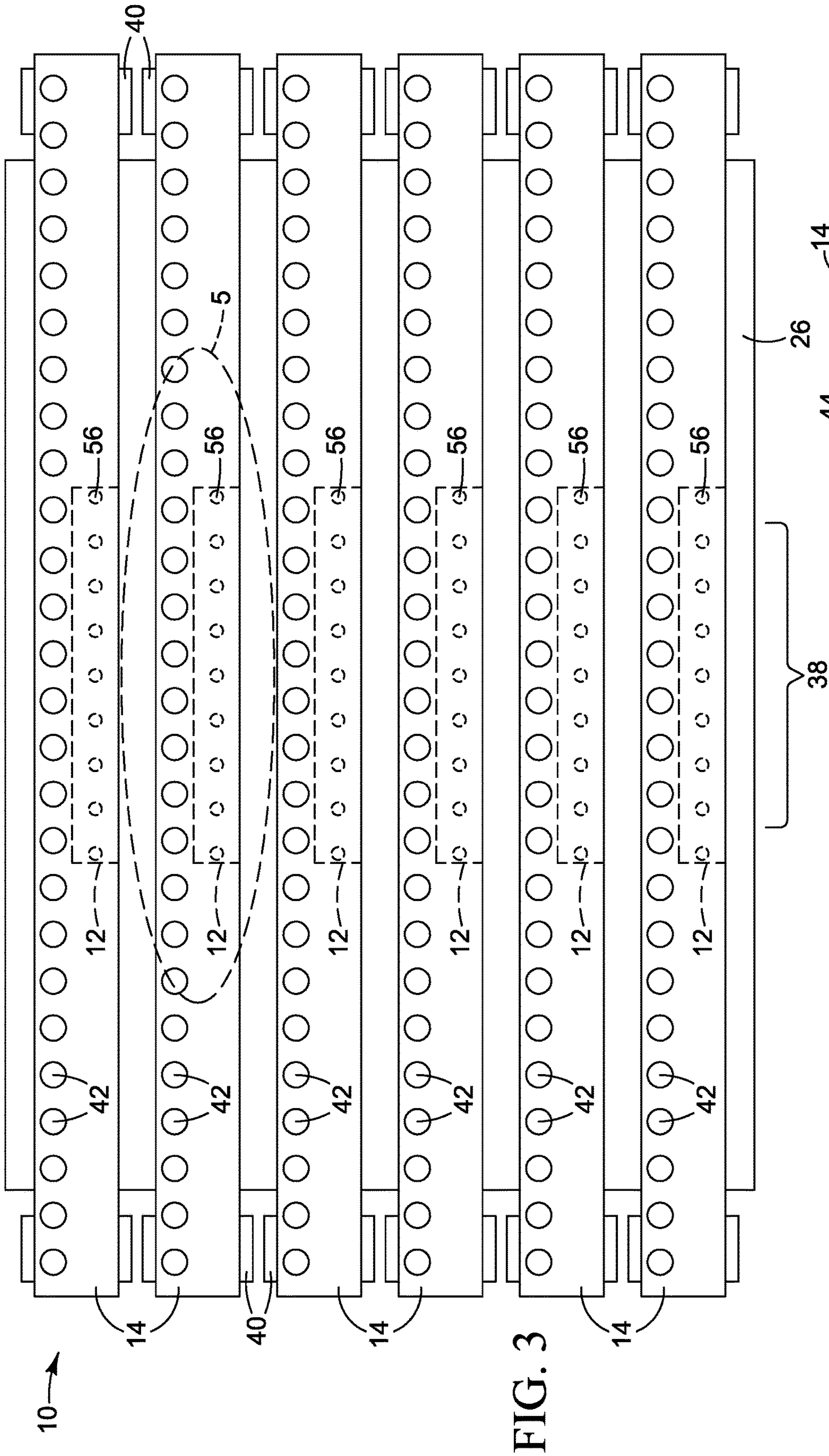
FIGS. 3 and 4 are plan and elevation views illustrating one example of a print media conveyor system with multiple print zone drivers.
Figure 4:
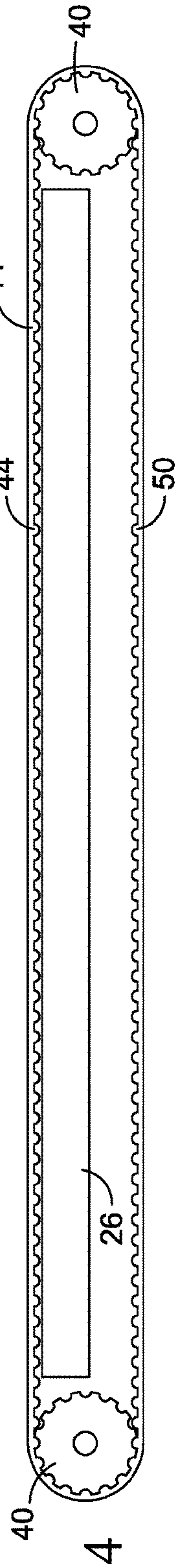
Figure 5:
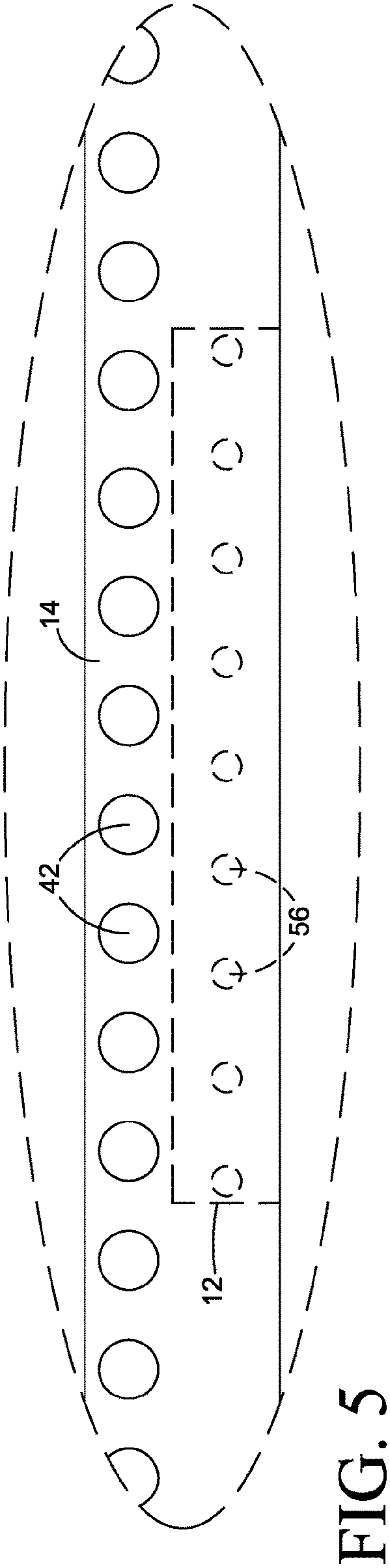
FIG. 5 is a plan view detail from FIG. 3.
Figure 6:
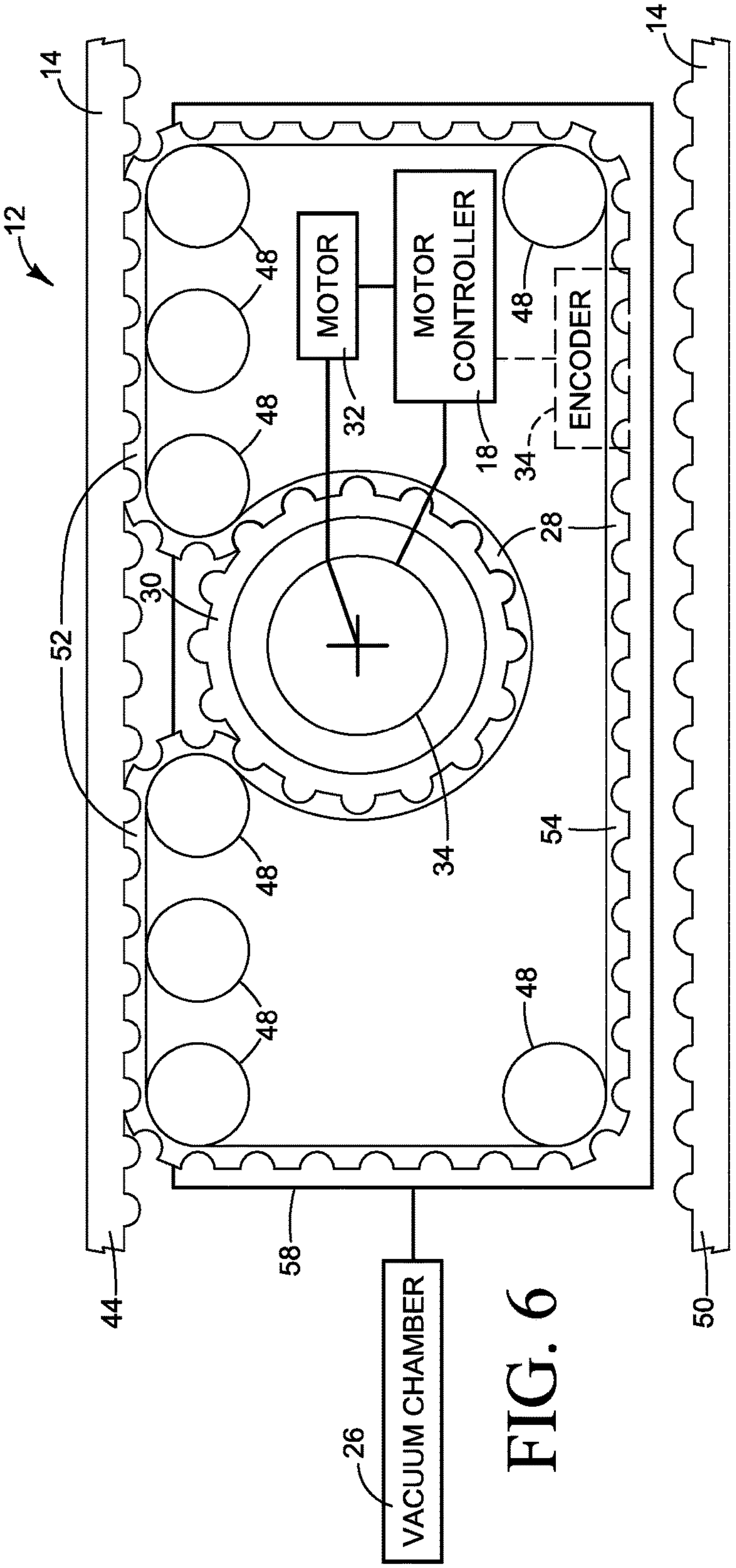
FIG. 6 is an elevation view of the detail of FIG. 5.
Figure 7:
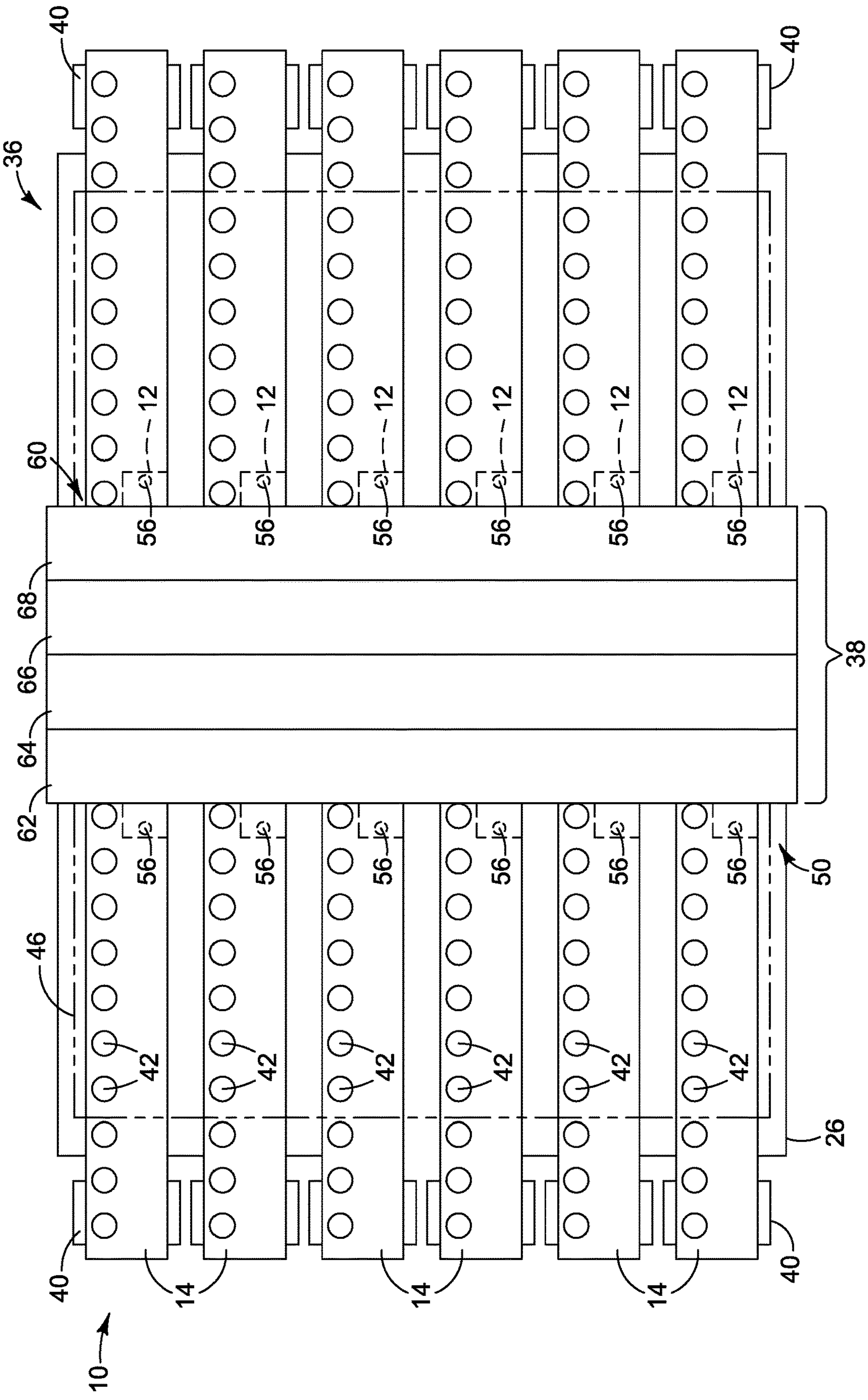
FIGS. 7 and 8 are plan and elevation views illustrating an example inkjet printer with a print media conveyor system from FIGS. 3-6.
Figure 8:
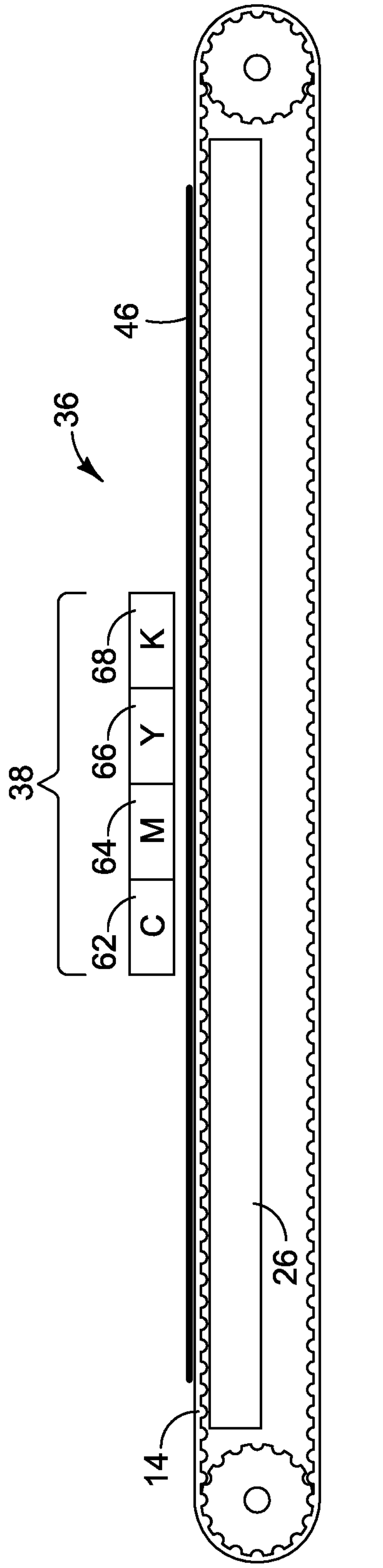

FIGS. 3 and 4 are plan and elevation views illustrating one example of a print media conveyor system 10 with multiple conveyor belts 14 and corresponding print zone drivers 12. FIG. 5 is a plan view detail from FIG. 3. FIG. 6 is an elevation view of the detail of FIG. 5. FIGS. 7 and 8 are plan and elevation views illustrating an example inkjet printer 36 with a print media conveyor system 10 from FIGS. 3-6.

Referring to FIGS. 3-8, system 10 includes toothed print media conveyor belts 14 that circulate through a print zone 38 around idler pulleys 40 at the urging of a corresponding driver 12. Each conveyor belt 14 includes vacuum holes 42 operatively connected to a vacuum chamber 26 along an upper run 44 of conveyor belt 14 to hold print media 46 flat for printing. A sheet of corrugated cardboard or other print media 46 is shown in FIGS. 7 and 8. Print media 46 is shown in phantom lines in FIG. 7 to not obscure the underlying features. Vacuum chamber 26 is omitted from FIGS. 5 and 6 to not obscure driver 12.

Referring to FIG. 6, each driver 12 includes a toothed drive belt 28 that circulates around idler pulleys 48 at the urging of a drive pulley 30. Driver 12 also includes a motor 32 to turn drive pulley 30, an encoder 34 and a motor controller 18 operatively connected to encoder 34 and motor 32. Drive belt 28 engages conveyor belt 14 to circulate the conveyer belt through the print zone. Encoder 34 measures the movement of conveyor belt 14 in the print zone indirectly through driver 12. Encoder 34 may be implemented, for example, as a rotary encoder 34 on drive pulley 30 as shown in FIG. 6 or a linear encoder 34 (depicted with dashed lines on drive belt 28. Measurements from encoder 34 are used by controller 18 executing instructions 24 (FIG. 1) to control the speed of conveyor belt 14 in the print zone through motor 32 turning drive pulley 30 circulating drive belt 28 moving conveyor belt 14. While encoder 34 is shown in FIG. 6 as part of driver 12, the encoder could be a separate part operatively connected to driver 12. For example, a linear encoder (not shown) on conveyor belt 14 in the print zone could be used. Referring to FIGS. 3-7, drive pulley 30 (e.g., as is driven by motor 32) is positioned directly under one or more print heads 62-68 of the printing unit 60 in the print zone 38, so as to be at least partially located within the print zone 38.

In the example shown in FIG. 6, driver 12 is configured to fit between the upper run 44 and the lower run 50 of conveyor belt 14. In some implementations, it may be desirable wrap drive belt 28 around as much of the circumference of drive pulley 30 as possible to engage a maximum number of teeth and distribute the drive force over more teeth, reducing stress on each tooth to help prolong the useful life of drive belt 28. In addition, more wrap helps reduce the unwanted effects of any eccentricity in drive pulley 30 by increasing the degree of circumferential engagement.

The configuration of a driver 12 shown in FIG. 6 is just one example. Other configurations are possible. For example: more or fewer idler pulleys 48 may be used to vary the length and/or stiffness of the engagement area; if a shorter height profile is desired to fit between the upper and lower runs of conveyor belt 14, a smaller diameter drive pulley 30 may be used; and/or if a continuous engagement area is desired, the orientation of driver 12 may be inverted from that shown to engage conveyor belt 14 along the uninterrupted run 54 of drive belt 28, rather than run 52 shown in FIG. 6.

In an example, as shown in FIGS. 3-6, a vacuum is applied the conveyor belt 14 through holes 56 in drive belt 28 to pull down conveyor belt 14 against drive belt 28 for better traction. Holes 56 in drive belt 28 are operatively connected to vacuum chamber 26 or another source of vacuum to apply a suction to conveyor belt 14 along the length of drive belt 28 engaging conveyor belt 14, for example by evacuating a driver housing 58. A common vacuum chamber 26 may be used to supply vacuum to both conveyor belt 14 to hold down print media 46 and to drive belt 28 to hold down conveyor belt 14.

Referring to FIGS. 7 and 8, inkjet printer 36 includes a printing unit 60 with print bars 62-68 over conveyor belts 14. Each print bar may dispense a different color ink, for example cyan (C), magenta (M), yellow (Y), and black (K). Printing unit 60 defines print zone 38 where ink is dispensed on to print media 46 carried by conveyor belts 14 under the print bars. Each print bar 62-68 includes one or multiple inkjet printheads that dispense ink on to print media 46 according to "firing" signals timed to produce the desired images at the desired locations on media 46.

The configuration of print media conveyor system 12 and printer 36 in FIGS. 3-8 is just one example. Other configurations are possible. For example, more or fewer conveyor belts 14 and corresponding drivers 12 could be used, including a single conveyor belt 14 with a single driver 12. For another example, a print media conveyor system 12 could be implemented in other types of printers that use a belt to carry print media past or against a printing unit.

Figure 9:
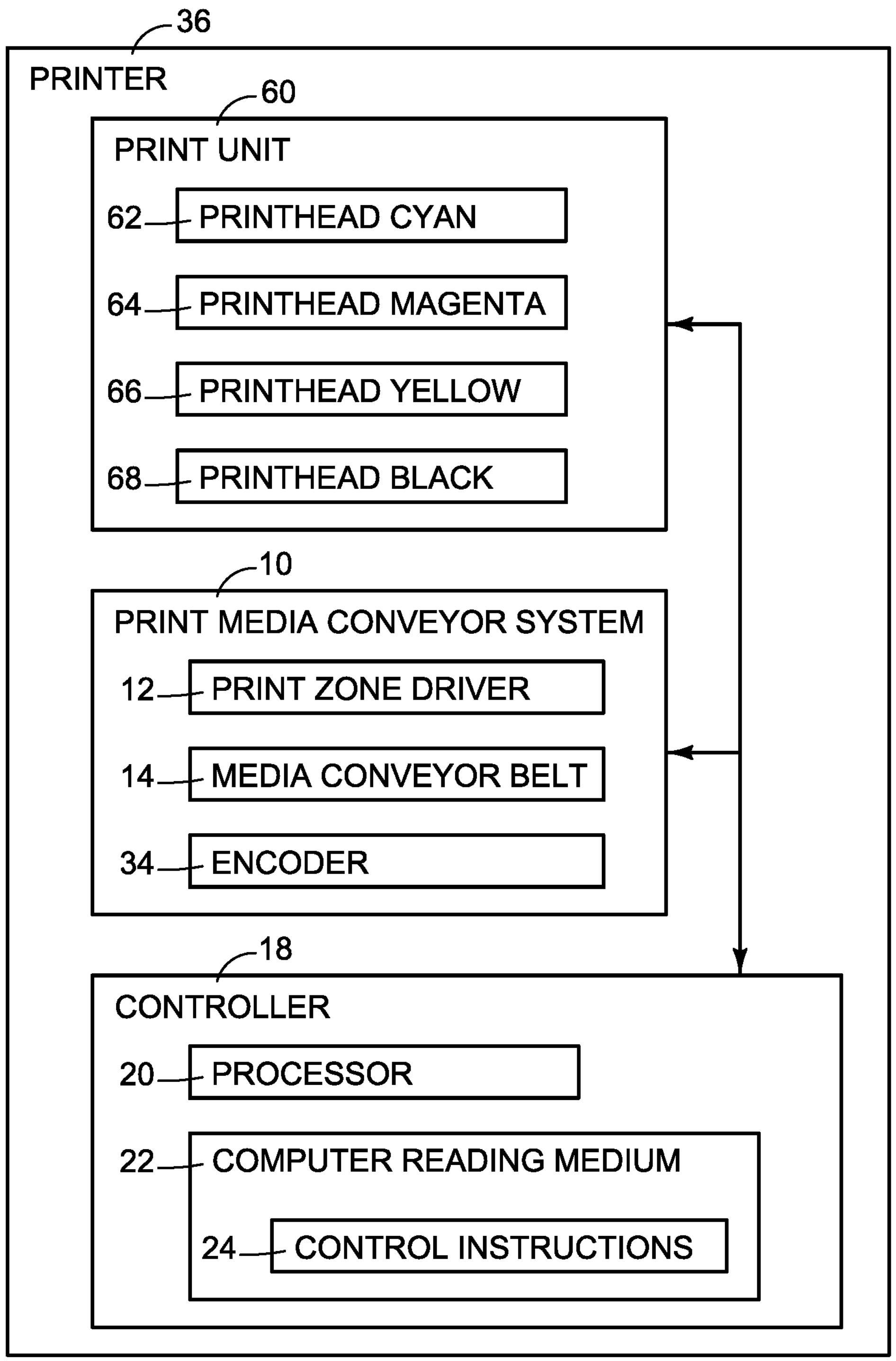
FIG. 9 is a block diagram illustrating an inkjet printer implementing one example of a print media conveyor system with a print zone driver.

FIG. 9 is a block diagram illustrating an inkjet printer 36 implementing one example of a print media conveyor system 10 with a print zone driver 12, such as a driver 12 shown in FIG. 6 that engages a print media conveyor belt 14 in the print zone to circulate belt 14. Referring to FIG. 9, printer 36 includes a printing unit 60 with printheads 62-68 that define a print zone where ink is dispensed on to print media carried by system 10. Each printhead 62-68 may be implemented, for example, in a print bar 62-68 shown in FIGS. 7 and 8. In this example, each printhead 62-68 dispenses cyan, magenta, yellow, and black ink, respectively. Each printhead 62-68 is operatively connected to a controller 18 executing control instructions 24 to dispense ink according to firing signals timed to produce the desired images at the desired locations on the print media.

An encoder 34 measures the movement of print media conveyor belt 14 in the print zone and communicates the measurements to controller 18. A processor 20 on controller 18 executing control instructions 24 controls the firing signals for printheads 62-68 based on movement of media conveyor belt 14 measured by encoder 34, to produce the desired images at the desired locations on the print media, for example by synchronizing the firing signals to variations in belt speed. Processor 20 on controller 18 executing control instructions 24 also controls driver 12 to maintain the desired speed of conveyor belt 14 through the print zone based on movement measured by encoder 34.

The examples shown in the figures and described above illustrate but do not limit the patent, which is defined in the following Claims.

"A", "an" and "the" used in the claims means one or more. For example, "a" belt means one or more belts and subsequent reference to "the" belt means the one or more belts.

What is claimed is:

1. A system to carry print media through a print zone in a printer, the system comprising:

an endless conveyor belt in a loop;

a driver operatively connected to the conveyor belt, the driver including a drivable drive pulley positioned directly under a print head of a printing unit to circulate the conveyor belt through the print zone;

an encoder under the print zone and operatively connected to the driver to measure movement of the conveyor belt in the print zone indirectly through the driver; and a controller programmed to control the driver based on measurements from the encoder.

2. The system of claim 1, wherein:

the driver comprises:

a drive pulley;

an endless drive belt in a loop, the drive belt wrapping the drive pulley and engaging the conveyor belt under the print zone;

a motor to turn the drive pulley; and the encoder comprises a rotary encoder on the drive pulley and/or a linear encoder on the drive belt.

3. The system of claim 1, wherein:

the conveyor comprises multiple conveyor belts;

the driver comprises multiple drivers each to circulate a corresponding one of the conveyor belts through the print zone;

the encoder comprises multiple encoders each operatively connected to a corresponding one of the drivers; and the controller is operatively connected to each of the encoders and each of the drivers, the controller programmed to control each driver based on movement measured by the encoders.

4. A system to carry print media through a print zone in a printer, the system comprising:

an endless conveyor belt in a loop;

a driver operatively connected to the conveyor belt, the driver including a drivable drive pulley positioned directly under the print zone to circulate the conveyor belt through the print zone;

an encoder under the print zone and operatively connected to the driver to measure movement of the conveyor belt in the print zone indirectly through the driver; and a controller programmed to control the driver based on measurements from the encoder, wherein the driver comprises:

a drive pulley;

an endless drive belt in a loop, the drive belt wrapping the drive pulley and engaging the conveyor belt under the print zone;

a motor to turn the drive pulley; and the encoder comprises a rotary encoder on the drive pulley and/or a linear encoder on the drive belt, and wherein:

the conveyor belt comprises a toothed conveyor belt;

the drive pulley comprises a toothed drive pulley; and the drive belt comprises a toothed drive belt with teeth that engage teeth on the conveyor belt and teeth on the drive pulley.

5. The system of claim 4, wherein the drive belt is between an upper run of the conveyor belt that carries print media in the print zone and a lower run of the conveyor belt.

6. The system of claim 4, comprising a vacuum chamber and holes in the conveyor belt operatively connected to the vacuum chamber to apply a suction to print media on the conveyor belt.

7. The system of claim 4, comprising a vacuum chamber and holes in the drive belt operatively connected to the vacuum chamber to apply a suction to the conveyor belt along a length of the drive belt engaging the conveyor belt.

8. A printer, comprising:

a printing unit defining a print zone in which the printing unit prints on print media;

multiple endless conveyor belts in a loop, the conveyor belts spaced apart from one another across the print zone and each conveyor belt having an upper run to carry, along with the upper run of each of the other conveyor belts, print media through the print zone; and multiple drivers each operatively connected to the upper run of a corresponding one of the conveyor belts, the multiple drivers including a drivable drive pulley positioned directly under a print head of a printing unit to circulate the corresponding conveyor belt through the print zone.

9. The printer of claim 8, wherein each driver comprises:

a drive pulley;

an endless drive belt in a loop, the drive belt wrapping the drive pulley and engaging the upper run of the corresponding conveyor belt under the print zone; and a motor to turn the drive pulley.

10. The printer of claim 9, comprising:

multiple rotary encoders each operatively connected to a corresponding one of the drive pulleys and/or linear encoders each operatively connected to a corresponding one of the drive belts; and a controller operatively connected to each of the encoders and each of the drivers, the controller programmed to control each driver based on movement measured by the corresponding encoder.

11. The printer of claim 10, comprising a vacuum chamber and holes in the drive belt operatively connected to the vacuum chamber to apply a suction to the conveyor belt along a length of the drive belt engaging the conveyor belt.

12. A printer, comprising:

a printing unit defining a print zone in which the printing unit prints on print media;

multiple endless conveyor belts in a loop, the conveyor belts spaced apart from one another across the print zone and each conveyor belt having an upper run to carry, along with the upper run of each of the other conveyor belts, print media through the print zone;

multiple drivers each operatively connected to the upper run of a corresponding one of the conveyor belts under the print zone to circulate the corresponding conveyor belt through the print zone, each driver comprising a drive pulley;

an endless drive belt in a loop, the drive belt wrapping the drive pulley and engaging the upper run of the corresponding conveyor belt under the print zone;

a motor to turn the drive pulley; and a rotary encoder operatively connected to the drive pulley and/or a linear encoder operatively connected to the drive belt; and a controller operatively connected to each of the encoders and each of the drivers, the controller programmed to control each driver based on movement measured by the corresponding encoder.

13. The printer of claim 12, wherein:
each conveyor belt comprises a toothed conveyor belt;
each drive pulley comprises a toothed drive pulley; and
each drive belt comprises a toothed drive belt with teeth that engage teeth on the corresponding conveyor belt and teeth on the corresponding drive pulley.

14. The printer of claim 13, wherein each drive belt is between the upper run and a lower run of the corresponding conveyor belt.

15. The printer of claim 13, comprising a vacuum chamber and holes in each of the conveyor belts operatively connected to the vacuum chamber to apply a suction to print media on the conveyor belts.

* * * * *